(12) United States Patent
Park

(10) Patent No.: US 7,153,908 B2
(45) Date of Patent: Dec. 26, 2006

(54) PEROXIDE CURED FLUOROCARBON ELASTOMER COMPOSITIONS

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 246 days.

(21) Appl. No.: 10/771,693

(22) Filed: Feb. 4, 2004

(65) Prior Publication Data

US 2005/0171282 A1    Aug. 4, 2005

(51) Int. Cl.
| C08F 289/00 | (2006.01) |
| C08F 214/18 | (2006.01) |
| C08L 27/22 | (2006.01) |
| C08L 27/24 | (2006.01) |
| C08L 23/26 | (2006.01) |

(52) U.S. Cl. ............... 525/192; 525/193; 525/199; 525/200; 525/240

(58) Field of Classification Search ................ 525/192, 525/193, 199, 200, 240
See application file for complete search history.

(56) References Cited

U.S. PATENT DOCUMENTS

| 3,037,954 A | 6/1962 | Gessler et al. |
| 4,035,565 A | 7/1977 | Apotheker et al. |
| 4,287,320 A | 9/1981 | Kolb |
| 4,450,263 A | 5/1984 | West |
| 4,696,989 A | 9/1987 | Oka et al. |
| 4,787,991 A | 11/1988 | Morozumi et al. |
| 5,206,293 A | 4/1993 | Sakai et al. |
| 5,354,811 A | 10/1994 | Kamiya et al. |
| 5,384,374 A | 1/1995 | Guerra et al. |
| 5,962,589 A * | 10/1999 | Matsumoto et al. ........ 525/199 |
| 6,066,697 A | 5/2000 | Coran et al. |
| 6,310,141 B1 | 10/2001 | Chen et al. |
| 6,407,174 B1 | 6/2002 | Ouhadi |
| 6,429,249 B1 | 8/2002 | Chen et al. |
| 6,437,030 B1 | 8/2002 | Coran et al. |
| 6,624,251 B1 | 9/2003 | Chmielewski |
| 2005/0222337 A1 * | 10/2005 | Park .......................... 525/199 |
| 2005/0288434 A1 * | 12/2005 | Sugiura et al. ............... 525/70 |

FOREIGN PATENT DOCUMENTS

EP    0 168 020 B1    10/1989

OTHER PUBLICATIONS

Schmiegel, Walter W., "A Review of Recent Progress in the Design and Reactions of Base-Resistant Fluoroelastomers.", IRC, Jul. 2003.
"AFLAS™ The Fluoroelastomer", Asahi Glass Company, Product Information, pp. 1-8, Apr. 11, 2003.
"Fluorine-Containing Polymers", Encyclopedia of Polymer Science & Engineering, vol. 7, 1987, Second Edition, pp. 256-267.
"Viton® Fluoroelasotmer, A Product of DuPont Dow Elastomers", Technical Information, DuPont Dow Elastomers, Copyright 1988.
Michael J. Moore, "Silanes as Rubber-to-Metal Bonding Agents", 160th Meeting of the Rubber Division, American Chemical Society, Cleveland Ohio, Paper No. 105, pp. 1-17, 2001.

* cited by examiner

*Primary Examiner*—Nathan M. Nutter
(74) *Attorney, Agent, or Firm*—Ronald W. Wangerow; Harness, Dickey & Pierce, PLC

(57) ABSTRACT

A process involves adding a peroxide masterbatch to a molten blend of a fluorocarbon elastomer and a thermoplastic material. The peroxide masterbatch contains greater than or equal to 5% weight percent organic peroxide, further contains a fluorocarbon elastomer, and typically also contains a crosslinker containing at least two sites of olefinic unsaturation. The fluorocarbon elastomer in the molten blend and in the peroxide masterbatch may be the same or different. After the peroxide masterbatch is added to the molten blend, the combination is mixed at a temperature and for a time sufficient to effect cure of the fluorocarbon elastomers. By using a masterbatch, a faster and more uniform dispersion of peroxide curative is possible due to pre-dispersion of peroxide in the elastomer phase, which leads to shaped articles having improved mechanical properties.

14 Claims, No Drawings

PEROXIDE CURED FLUOROCARBON ELASTOMER COMPOSITIONS

The present invention relates to dynamic vulcanization of fluorocarbon elastomers in thermoplastics. More particularly, it relates to the use of organic peroxides as curing agents for the elastomers.

Cured elastomers or rubbers have a variety of physical properties useful for applications in molded articles. Among the properties are a high degree of flexibility, elasticity, and resistance to compression set. As such they find use in a variety of applications, such as seals and gaskets. Uncured elastomers or rubbers are in the form of a resin or gum. To obtain a molded article with suitable elastomeric properties, the uncured resins are crosslinked or cured with a variety of crosslinking agents.

For conventional elastomers, cure is generally carried out in a mold under conditions of temperature and pressure suitable for forming a cured or partially cured article. In the interest of increased turnaround time and to save on manufacturing costs, molded articles are generally released from the mold before the crosslinking reactions that provide cure have been completed. Under these situations, the molded article goes through a process of "post cure", where the elastomeric properties of the molded article develop further.

Dynamically vulcanized rubbers are prepared by carrying out the crosslinking reaction while the elastomer is stirred or mixed together with a thermoplastic material. The thermoplastic material forms a continuous phase and the cured rubber particles are dispersed in the thermoplastic as a discrete phase. The compositions are dynamically vulcanized for a period of time to allow elastomeric properties to develop. Typically, the cured or partially cured dynamic vulcanizate is then transferred into a mold to prepare molded articles for use such as seals and gaskets. Due to the same phenomenon of post cure, crosslinking reactions may continue to occur in the mold after the dynamic vulcanization process.

The reactions occurring during the post cure process generate heat. The heat generated can lead to volatilization of various components of the composition during the post cure phase. This volatilization can result, for example, in a porous cured article, or an article having a rough surface. Physical properties such as tensile strength may be adversely affected.

In one aspect, the problem of post curing can be minimized by using fast reacting crosslinkers such as organic peroxides, preferably in combination with organic crosslinking molecules having two or more sites of olefinic unsaturation. Because the peroxide initiated cure is rapid, the cure tends to be nearly completed by the time the molding is finished, or in the case of dynamic vulcanization, by the time the dynamic blending is finished. In this way, peroxide initiated curing provides faster turnaround time and molded articles with desirable physical properties.

Because it is added to a hot molten mixture of an elastomer and thermoplastic, the peroxide may splash or bump upon addition. This can lead to formation of molded parts with pores or a rough surface, much in the same way that reactions during post cure cause them, as described above.

It would therefore be desirable to provide methods for curing fluorocarbon elastomers in a dynamic vulcanization process, using fast curing peroxide initiating curing systems, but avoiding the disadvantages noted above.

SUMMARY

In one embodiment, a high temperature peroxide is added to a molten blend of fluorocarbon elastomer and thermoplastic material to make a thermoplastic vulcanizate (TPV) by a process of dynamic vulcanization. The peroxide is subject to a lower level of volatilization and degradation due to its high temperature stability, which leads to improved physical properties of shaped articles made from the TPV's.

In another embodiment, advantages are provided by a process that involves adding a peroxide masterbatch to a molten blend of a fluorocarbon elastomer and a thermoplastic material. The molten blend contains a first portion of a fluorocarbon elastomer, while the peroxide masterbatch contains a second portion of a fluorocarbon elastomer. The fluorocarbon elastomer in the molten blend and in the peroxide masterbatch may be the same or different. After the peroxide masterbatch is added to the molten blend, the combination is mixed at a temperature and for a time sufficient to effect cure of the fluorocarbon elastomers. The peroxide masterbatch contains greater than or equal to 5% weight percent organic peroxide, further contains a fluorocarbon elastomer, and typically also contains a crosslinker containing at least two sites of olefinic unsaturation.

A method of preparing a moldable polymer composition thus comprises melt blending a curable fluorocarbon elastomer and a thermoplastic material, and adding a curing composition comprising the peroxide masterbatch to the melt blend. Thereafter, the curing composition, the elastomer, and the thermoplastic material are heated while continuing to mix for a time and at a temperature sufficient to cure the fluorocarbon elastomer.

The method may be used to prepare melt processable molded articles. The molded articles comprise a peroxide dynamic vulcanizate of a fluorocarbon elastomer and a thermoplastic material. In some embodiments, the thermoplastic is a fluorine containing thermoplastic. Molded articles made by the processes have elastomeric properties suitable for use in seals and gaskets. The properties are generally more advantageous than the properties of peroxide cured articles made without the masterbatch method. For example, the tensile modulus of the molded article is above 10 MPa in some embodiments, while in others embodiments, the tensile modulus is above 12 MPa or greater than 15 MPa.

DESCRIPTION

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The terms "elastomeric material", "elastomer", and the like refer to chemical compositions that possess, or can be modified (i.e. cured or crosslinked) to possess elastomeric properties. According to context, the terms refer to an uncured or partially cured material, in which elastomeric properties are not fully developed, or to a cured rubber-like material, with fully developed elastomeric properties. At some points in the specification, the terms are used with adjectives such as "cured", "partially cured", or "uncured" for clarity.

The terms "curing agent", "curative", "curative agent", and the like are used interchangeably to designate the chemical compound or composition that reacts with the (uncured) elastomer to form a cured elastomer and to develop the elastomeric properties of the cured product. According to context it is used to refer to a formal curing initiator (e.g. a radical initiator such as a peroxide) as well as a crosslinking agent that may be used in conjunction with the initiator (e.g. triallylisocyanurate). At some points, the term "curing system" or the like is used to refer to a combination of initiator and crosslinker and optional additional components used in the curing. It is to be understood that often the curing system is provided by an elastomer supplier (and may be incorporated into the elastomer), and may be used according to the manufacturer's instructions.

In one embodiment, a method of preparing a molded polymer composition comprises forming a mixture of a curable fluorocarbon elastomer and a thermoplastic material at a temperature above the melt flow temperature or melting point of the thermoplastic, adding a curing composition to the mixture, and heating while continuing to mix the curing composition, the elastomer, and thermoplastic material. The curing composition contains an initiator having a half-life of 0.1 hours or more at a temperature of 180° C. or higher, and further contains a crosslinking agent. Preferably, the crosslinker contains at least two sites of olefinic unsaturation. In various embodiments, the initiator is an organic peroxide. In a preferred embodiment, the thermoplastic material comprises a fluorine containing thermoplastic polymer.

The fluorocarbon elastomer used in the melt blend with the thermoplastic material comprises a fluorine-containing polymer that may be cured upon action of a peroxide initiated crosslinker to provide a cured fluorocarbon rubber having elastomeric properties. Many different types of fluorocarbon elastomers are commercially available. In one embodiment, the fluorocarbon elastomers comprise copolymers of vinylidene fluoride. In another embodiment, perfluororubbers may be used that are based on polymers and copolymers of monomers containing no carbon hydrogen bonds. Another class of fluorocarbon elastomer is given by copolymers of tetrafluoroethylene and olefins such as propylene. In general, it is preferred that the fluorocarbon also have small amounts of a cure site monomer, discussed below, to enhance the curing with the peroxide initiated crosslinker.

In another embodiment, the invention provides a process for making a melt processable fluorocarbon rubber composition comprising adding a peroxide masterbatch to a molten blend of a first portion of fluorocarbon elastomer and a thermoplastic material, wherein the masterbatch comprises greater than or equal to 5% weight percent organic peroxide and further comprises a second portion of a fluorocarbon elastomer; and mixing the peroxide masterbatch, the first portion of fluorocarbon elastomer, and the thermoplastic material while heating for a time and at a temperature sufficient to effect cure of the fluorocarbon elastomers. In one embodiment, the process comprises injecting a composition comprising the first portion of fluorocarbon elastomer and the thermoplastic material into a twin-screw extruder with a first feeder; and adding the masterbatch into the extruder with a second feeder downstream from the first.

The process may be carried out by adding a peroxide masterbatch to a molten blend of a first portion of fluorocarbon elastomer and a thermoplastic material. The peroxide masterbatch, the first portion of fluorocarbon elastomer and the thermoplastic material are then heated with mixing for a time and at a temperature effective to cure the fluorocarbon elastomer. The process thus involves dynamic vulcanization of a fluorocarbon elastomer in a thermoplastic material, preferably a fluorine containing thermoplastic material, with peroxide curing.

The first portion of fluorocarbon elastomer and the thermoplastic material may be added into the barrel of a twin-screw extruder with a first feeder while the peroxide masterbatch is injected into the extruder with a second feeder downstream of the first. Continuous or semi-continuous processes for making the multiple polymer composition may be carried out in such twin extruders.

In one aspect, the addition of peroxide curative in the form of a masterbatch with an elastomer matrix phase leads to better uniformity and faster dispersion of peroxide curative in the peroxide curable main elastomer phase of the TPV. It also provides effective use of curative by minimizing the volatility of peroxide curative during the dynamic vulcanization compounding process of the TPV, especially at high temperature.

In another embodiment, the invention provides a molded article comprising a peroxide cured dynamic vulcanizate of a fluorocarbon elastomer and a fluorine containing thermoplastic, having a tensile modulus above 10 MPa, preferably above 12 MPa, and more preferably above 15 MPa. It is believed the dynamically vulcanized TPV compounding process with a peroxide curative-containing masterbatch provides better mechanical properties by achieving more homogeneously cured elastomer phase in the thermoplastic matrix phase, and by minimizing the volatility of the peroxide curative especially at high temperature.

Various types of fluoroelastomers may be used. One classification of fluoroelastomers is given in ASTM-D 1418, "Standard practice for rubber and rubber latices-nomenclature". The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68–69.5% by weight fluorine. Another FKM elastomer is chemically described as a terpolymer of tetrafluoroethylene, a fluorinated vinyl ether, and vinylidene fluoride. Such elastomers tend to have improved low temperature performance. In various embodiments, they are available with 62–68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. In some embodiments, the elastomer gums have viscosities that give a Mooney viscosity in the range generally of 15–160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In various embodiments, the fluoroelastomers of the composition of the invention also comprise at least one halogenated cure site or a reactive double bond resulting from the presence of a copolymerized unit of a non-conjugated diene. In various embodiments, the fluorocarbon elastomers contain up to 5 mole % and preferably up to 3 mole % of repeating units derived from the so-called cure site monomers.

The cure site monomers are preferably selected from the group consisting of brominated, chlorinated, and iodinated olefins; brominated, chlorinated, and iodinated unsaturated ethers; and non-conjugated dienes. Halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromoperfluoroethyl perfluorovinyl ether and fluorinated compounds of the class $CF_2Br$—$R_f$—O—$CF$=$CF_2$ ($R_f$ is perfluoroalkylene), such as $CF_2BrCF_2O$—$CF$=$CF_2$, and fluorovinyl ethers of the class $ROCF$=$CFBr$ or $ROCBr$=$CF_2$, where R is a lower alkyl group or fluoroalkyl group, such as $CH_3OCF$=$CFBr$ or $CF_3CH_2OCF$=$CFBr$.

Iodinated olefins may also be used as cure site monomers. Suitable iodinated monomers include iodinated olefins of the formula: $CHR$=$CH$—$Z$—$CH_2CHR$—$I$, wherein R is —H or —$CH_3$; Z is a $C_1$–$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF$=$CF_2$ and $ICH_2CF_2O[CF(CF_3)CF_2O]_nCF$=$CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy) ethane; 2-iodo-1-(perfluorovinyloxy)-1,1,2,2-tetrafluoroethylene; 1,1,2,3,3 3-hexafluoro-2-iodo-1-(perfluorovinyloxy) propane; 2iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other cure monomers may be used that introduce low levels, preferably less than or equal about 5 mole %, more preferably less than or equal about 3 mole %, of functional groups such as epoxy, carboxylic acid, carboxylic acid halide, carboxylic ester, carboxylate salts, sulfonic acid groups, sulfonic acid alkyl esters, and sulfonic acid salts. such monomers and cure are described for example in Kamiya et al., U.S. Pat. No. 5,354,811.

Fluorocarbon elastomers based on cure site monomers are commercially available. Non-limiting examples include Viton GF, GLT-305, GLT-505, GBL-200, and GBL-900 grades from DuPont. Others include the G-900 and LT series from Daikin, the FX series and the RE series from NOK, and Tecnoflon P457 and P757 from Solvay.

In some embodiments, the thermoplastic material comprises at least one fluorine containing thermoplastic polymer, or fluoroplastic. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Commercial embodiments are available which contain 59 to 76% by weight fluorine. An example is Dyneon THV, which exhibits a melting point of from about 120° C. to about 200° C., depending on the composition. In one embodiment, partially fluorinated fluoroplastics are preferred that are characterized by a melting point of from about 105° C. to about 160° C. Use of these rather low melting fluoroplastics permits the use of peroxide curing agents at a low temperature where undesirable volatilization of the peroxides is minimized.

Non-fluorine containing thermoplastic polymers may also be used. In one aspect, a thermoplastic material is one the melt viscosity of which can be measured, such as by ASTM D-1238 or D-2116, at a temperature above its melting point.

The thermoplastic material of the invention may be selected to provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

A thermoplastic elastomer may have alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. Preferably, the materials are crystalline or semi-crystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing a-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

The curing composition contains a radical initiator. The initiator is believed to function by first extracting a hydrogen or halogen atom from the fluorocarbon elastomer to create a free radical that can be crosslinked. Crosslinkers may also be included in the curing composition. The crosslinkers also contain at least two sites of olefinic unsaturation, which react with the free radical on the fluorocarbon elastomer molecule generated by the reaction of the initiator.

In various embodiments, the initiators have peroxide functionality. As examples of initiators, a wide range of organic peroxides is known and commercially available. The initiators, including the organic peroxides, are activated over a wide range of temperatures. The activation temperature may be described in a parameter known as half-life. Typically values for half-lives of, for example, 0.1 hours, 1 hour, and 10 hours are given in degrees centigrade. For example a $T_{1/2}$ at 0.1 hours of 143° C. indicates that at that temperature, half of the initiator will decompose within 0.1 hours. Organic peroxides with a $T_{1/2}$ at 0.1 hours from 118° C. to 228° C. are commercially available. Such peroxides have a half-life of at least 0.1 hours at the indicated temperatures. The $T_{1/2}$ values indicate the kinetics of the initial reaction in crosslinking the fluorocarbon elastomers, that is decomposition of the peroxide to form a radical containing intermediate.

In some embodiments, it is preferred to match the $T_{1/2}$ of the initiator such as an organic peroxide to the temperature of the molten material into which the curing composition is to be added. In various embodiments, the initiator has a thermal stability such that the half-life is at least 0.1 hours at temperatures of 180° C. or higher. In other embodiments, suitable initiators have a half-life of 0.1 hours at 190° C. or higher, or at temperatures of 200° C. or higher. Non-limiting examples of peroxides and their $T_{1/2}$ for a half-life of 0.1 hours include Trigonox 145-E85 ($T_{1/2}$=182° C.), Trigonox M55 ($T_{1/2}$=183° C.), Trigonox K-90 ($T_{1/2}$=195° C.), Trigonox A-W70 ($T_{1/2}$=207° C.), and Trigonox TAHP-W85 ($T_{1/2}$=228° C.). A non-limiting example of a non-peroxide initiator is Perkadox-30 ($T_{1/2}$=284° C.). The Trigonox and Perkadox materials are commercial or developmental products of AkzoNobel.

Non-limiting examples of commercially available organic peroxides for initiating the cure of fluorocarbon elastomers include butyl 4,4-di-(tert-butylperoxy)valerate; tert-butyl peroxybenzoate; di-tert-amyl peroxide; dicumyl peroxide; di-(tert-butylperoxyisopropyl)benzene; 2,5-dimethyl-2,5-di(tert-butylperoxy)hexane; tert-butyl cumyl peroxide; 2,5,-dimethyl-2,5-di(tert-butylperoxy)hexyne-3; di-tert-butyl peroxide; 3,6,9-triethyl-3,6,9-trimethyl-1,4,7-triperoxonane; 1,1,3,3-tetramethylbutyl hydroperoxide; diisopropylbenzene monohydroperoxide; cumyl hydroperoxide; tert-butyl hydroperoxide; tert-amyl hydroperoxide; tert-butyl peroxyisobutyrate; tert-amyl peroxyacetate; tert-butylperoxy stearyl carbonate; di(1-hydroxycyclohexyl) peroxide; ethyl 3,3-di(tert-butylperoxy)butyrate; and tert-butyl 3-isopropenylcumyl peroxide.

Non-limiting examples of crosslinking co-agents include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N', N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate. The crosslinking co-agents preferably contain at least two sites of olefinic unsaturation. These sites of unsaturation react with the free radical generated on the fluorocarbon elastomer molecule and crosslink the elastomer. A commonly used crosslinking agent is triallylisocyanurate (TAIC).

In various embodiments, the cured fluorocarbon elastomer compositions of the invention are prepared by a process of dynamic vulcanization. Dynamic vulcanization is a vulcanization or a curing process for a rubber (here a fluorocarbon elastomer) contained in a thermoplastic composition, wherein the curable rubber is vulcanized under conditions of sufficiently high shear at a temperature above the melting point of the thermoplastic component. In this way, the rubber is simultaneously crosslinked and dispersed within the thermoplastic matrix. Dynamic vulcanization may be carried out by applying mechanical energy to mix the elastomeric and thermoplastic components at elevated temperature in the presence of a curative in conventional mixing equipment, such as roll mills, Moriyama mixers, Banbury mixers, Brabender mixers, continuous mixers, mixing extruders such as single and twin-screw extruders, and the like. An advantageous characteristic of dynamically cured compositions is that, not withstanding that the elastomeric component is fully cured, the composition can be processed and reprocessed by conventional plastic processing techniques such as extrusion, injection molding, and compression molding. Scrap or flashing can also be salvaged and reprocessed with thermoplastic techniques.

The vulcanized elastomeric material that results from the process of dynamic vulcanization is generally present as small particles within a continuous thermoplastic polymer matrix. A co-continuous morphology is also possible depending on the amount of elastomeric material relative to thermoplastic material, the cure system, the mechanism of cure and the amount and degree of mixing.

After dynamic vulcanization, a homogeneous mixture is obtained wherein the cured fluoroelastomer is in the form of dispersed particles having an average particle smaller than about 50 micrometers, preferably of an average particle size smaller than about 25 micrometers. Typically, the particles have an average size of 10micrometers or less, more preferably 5 micrometers or less. In some embodiments, the particles have an average size of 1 micrometer or less. In other embodiments, even when the average particle size is higher, there will be a significant number of cured elastomer particles with a diameter of less than 1 micron dispersed in the thermoplastic matrix.

Masterbatches of peroxide are prepared by combining the peroxide cure initiator, a fluorocarbon elastomer, and optionally a crosslinking agent. The masterbatch may contain from about 5 to about 50% by weight of the peroxide. The masterbatches may be conveniently prepared by combining the ingredients in conventional mixers such as Banbury mixers, and the like. They may also be compounded on screw mixers such as twin-screw extruders. The masterbatches containing fluorocarbon elastomer and peroxide may be added to molten mixtures during the dynamic vulcanization processing batch mixtures or in continuous mixers such as twin-screw extruders.

The fluorocarbon elastomer of the peroxide masterbatch may be chosen to be compatible with mixing in the fluorocarbon elastomer during the dynamic vulcanization process. In typical dynamic vulcanization processes, a fluorocarbon elastomer is mixed together in a molten thermoplastic material. The temperature is typically 10–20° C. higher than the melting point of the thermoplastic. Adding the peroxide curing agent, optionally along with a crosslinking agent containing multiple sites of olefinic unsaturation, in the form of a masterbatch allows for faster incorporation of the peroxide curing agent into the elastomer phase of the dynamic vulcanizate. It is also believed that the fluorocarbon elastomer component of the masterbatch protects the peroxide from bumping and volatilization upon addition to the molten mixture.

In one embodiment, the fluorocarbon elastomer of the peroxide masterbatch and that of the molten mixture are selected to be the same. In this way, the masterbatch containing the peroxide is immediately compatible with the fluorocarbon elastomer of the dynamic vulcanizate. By using the masterbatch method, a portion of the fluorocarbon elastomer to be cured in the dynamic vulcanization process is added along with the peroxide. Recipes for the dynamic vulcanizations, along with the charges of fluorocarbon elastomer during the different steps of the dynamic vulcanization process, can be designed and calculated depending on the concentration of the fluorocarbon elastomer in the masterbatch.

The masterbatch can contain a wide range of peroxide concentrations, but it is usually preferred to make masterbatches having from about 5% up to about 50% by weight peroxide. In some embodiments, it will be desirable to add peroxide in the master batch process in as little fluorocarbon elastomer as possible, so as to achieve desired properties in the fully cured dynamic vulcanizate. In other embodiments, it may be desirable to add more of the fluorocarbon elastomer into the dynamic vulcanization process after the initial melt blending of the fluorocarbon elastomer and the thermoplastic. In these cases, masterbatches having peroxide concentrations toward the lower end of the preferred range may be used.

The masterbatch is blended under conditions such that the blending temperature does not exceed a temperature at which the peroxide would act to cure the fluorocarbon elastomer. Typically, the masterbatch may be blended at temperatures up to 100° C., in order to provide a mixture of low enough viscosity for efficient blending. A preferred temperature range for blending of the masterbatch is 80–100° C. For reactive elastomers, it may be desirable to blend at 80° C. or less.

The cured dynamic vulcanizates of the invention may be made in batch, semi-batch, or continuous processes. For example, melt processable fluoroelastomer compositions may be made by blending a thermoplastic material and a fluorocarbon elastomer to form a first mixture, at a temperature above a temperature at which the thermoplastic will flow sufficiently, to form a dispersion of the fluorocarbon elastomer in thermoplastic. Such temperature may be referred to as a melt flow temperature. Next, a second mixture (masterbatch) is provided that contains a fluorocarbon elastomer and preferably greater than about 5% by weight of an organic peroxide. The masterbatch is provided at a temperature below that at which the peroxide would activate to initiate crosslinking of the fluorocarbon elastomer. The first mixture and the second mixtures are then combined and blended together while heating at a temperature and for a time sufficient to effect cure of the fluorocarbon elastomer in the first and second mixtures.

The process may also be carried out continuously, for example in extrusion mixers such as a twin-screw extruder. In one embodiment, a solid blend of an uncured fluorocarbon elastomer and a thermoplastic material is delivered to a first feeder of a first twin-screw extrusion apparatus. The solid blend is injected into the barrel of the extruder, with the barrel heated above a temperature at which the thermoplastic will melt and flow, to produce a dispersion of the fluorocarbon elastomer in the thermoplastic. For example, the barrel may be heated above the crystalline melting temperature of the thermoplastic material. In preferred embodiments, the temperature is 10°, 20° or 30° C. higher than the melting temperature of the thermoplastic. For example, the barrel may be heated above 180° C., above 210° C., or above 240° C. The solid blend is then mixed in the twin-screw extruder to form a homogeneous melt blend. A peroxide masterbatch containing greater or equal to 5% by weight of an organic peroxide is then delivered to a second feeder and injected into the barrel of the twin-screw extruder at a point downstream of the first feeder. The peroxide masterbatch and the homogeneous melt blend in the barrel are then further mixed while continuing to heat for a time and at a temperature sufficient to effect cure of the fluorocarbon elastomers. The cured dynamic vulcanizate may then be extruded from the twin-screw extrusion apparatus.

In an alternate embodiment, the peroxide masterbatch may be delivered to the second feeder with a twin-screw extrusion apparatus that blends the organic peroxide, fluorocarbon elastomer, and optional crosslinking agent at a temperature less than that which would activate the peroxide to cure the elastomer. In this way, it is possible to continuously feed a fluorocarbon elastomer and thermoplastic material at a first feeder port, and a curing agent and fluorocarbon elastomer at a second port downstream from the first.

After extrusion from the mixing apparatus, the dynamically vulcanized strand may be cooled in a water bath and chopped into pellets for later use.

The use of the peroxide masterbatch method of making dynamic vulcanizates leads to the formation of molded articles having an advantageous combination of physical properties, when compared to the physical properties of articles made by adding the peroxide and crosslinking co-agent as individual components instead of as part of a masterbatch. The masterbatch method also allows the use of high melting thermoplastics and fluoroplastics to make dynamic vulcanizates, while still retaining acceptable elastomeric properties. At 150° C., it is possible to make articles having a tensile strength above 10 MPa, or even above 15 MPa or above 20 MPa. Even at 250° C., articles can be made have a tensile strength above 10 MPa, preferably above 12 MPa, and more preferably above 15 MPa. Articles made at these temperatures without the masterbatch method tend to exhibit lower or less advantageous values of tensile strength and other properties.

The invention has been described above with respect to preferred embodiments, further non-limiting examples of the compositions and methods of the invention are given in the examples that follow.

EXAMPLES

Example 1

Preparation of Peroxide Masterbatches

The procedure to make masterbatches containing curable fluorocarbon elastomer is as follows: 1) Melt the fluorocarbon elastomer, (for example Tecnoflon P757, a peroxide curable fluorocarbon elastomer containing a cure site, commercially available from Solvay) in a batch mixer such as a Brabender with an internal mixer attachment at a temperature of from 80–100° C. 2) Add a curative package consisting of Luperco 101 XL and TAIC. Luperco 101 XL contains as an active ingredient 2.5,-dimethyl-2.5-di(tert-butylperoxy)hexane. TAIC is triallylisocyanurate. Continue mixing until a homogeneous mixture is obtained. 3) Discharge the mixture from the internal mixer, cool and pulverize into a powder or small pellets. The compositions may then be used as masterbatch material during dynamic compounding of fluorocarbon elastomers with thermoplastic material.

Masterbatches are made at three different concentrations of peroxide and TAIC, given in Examples 1a, 1b, and 1c.

| Ingredients | Ex 1a phr | Ex 1b phr | Ex 1c phr |
|---|---|---|---|
| Tecnoflon P757 | 100.0 | 100.0 | 100.0 |
| Luperco 101 XL | 15.0 | 30.0 | 45.0 |
| TAIC, 75% Dispersion | 20.00 | 40.00 | 60.00 |

Examples 2–4

Continuous and Batch Processes

Examples 2–4 illustrate recipes for making moldable compositions of the invention. They can be made by either batch or continuous processes.

In a batch process, the peroxide curable elastomer (Tecnoflon P757) and the thermoplastic (here a fluoroplastic, Kynar Flex 2500-04) are mixed and melted in a Brabender or Banbury type batch mixer at 150° C. for 5 minutes. The zinc oxide is then stirred in. A chopped masterbatch material (1–3 mm size, Example 1) is added to the mixer and stirred for an additional 3–5 minutes at 150° C. to form a fully cured thermoplastic vulcanizate. Alternatively, the mixing may be carried out for a shorter time such as 30 seconds to prepare a partially cured vulcanizate. The composition is then discharged from the batch mixer and granulated to make small size pellets for use in subsequent fabrication processes, such as injection molding, compression molding, blow molding, single layer extrusion, multi-layer extrusion, insert molding, and the like.

A continuous process is carried out in a twin-screw extruder. Tecnoflon P757 and Kynar Flex 2500-04 pellets are mixed and added to a hopper. The pellets are fed into the barrel, which is heated to 150° C. The screw speed is 100–200 rpm. At a downstream hopper, pellets of a peroxide masterbatch are fed into the barrel. The downstream port is located about one third of the total barrel length from the end of the extruder exit. The masterbatch is melted and blended with the molten elastomer and (fluoro)plastic mixture for a time determined by the screw speed and the length of the barrel. For example, the residence time is about 4–5 minutes at 100 rpm and about 2–2.5 minutes at 200 rpm. The cured material is extruded through 1–3 mm diameter strand die and is quenched by cooling in a water bath before passing through a strand pelletizer. The pellets may be processed by a wide variety of thermoplastic techniques into molded articles. The material may also be formed into plaques for the measurement of physical properties.

Example 2

| Ingredients | Ex 2a phr | Ex 2b phr | Ex 2c phr | Ex 2d phr | Ex 2e phr |
|---|---|---|---|---|---|
| Tecnoflon P757 | 80.0 | 80.0 | 80.0 | 80.0 | 80.0 |
| Kynar Flex 2500-04 | 25.0 | 50.0 | 100.0 | 150.0 | 200.0 |
| ZnO | 5.00 | 5.00 | 5.00 | 5.00 | 5.00 |
| MT N-990 carbon black | 10.00 | 10.00 | 10.00 | 10.00 | 10.00 |
| Masterbatch - Ex 1a | 20.00 | 20.00 | 20.00 | 20.00 | 20.00 |

Example 3

| Ingredient | Ex 3a phr | Ex 3b phr | Ex 3c phr | Ex 3d phr | Ex 3e phr |
|---|---|---|---|---|---|
| Technoflon P757 | 90.0 | 90.0 | 90.0 | 90.0 | 90.0 |
| Kynar Flex 2500-04 | 25.0 | 50.0 | 100.0 | 150.0 | 200.0 |
| ZnO | 5.00 | 5.00 | 5.00 | 5.00 | 5.00 |
| MT N-990 Carbon Black | 10.00 | 10.00 | 10.00 | 10.00 | 10.00 |
| Masterbatch - Ex 1b | 10.00 | 10.0 | 10.00 | 10.00 | 10.00 |

Example 4

| Ingredient | Ex 4a phr | Ex 4b phr | Ex 4c phr | Ex 4d phr | Ex 4e phr |
|---|---|---|---|---|---|
| Technoflon P757 | 93.3 | 93.3 | 93.3 | 93.3 | 93.3 |
| Kynar Flex 2500-04 | 25.0 | 50.0 | 100.0 | 150.0 | 200.0 |
| ZnO | 5.00 | 5.00 | 5.00 | 5.00 | 5.00 |
| MT N-990 Carbon Black | 10.00 | 10.00 | 10.00 | 10.00 | 10.00 |
| Masterbatch - Ex 1c | 6.70 | 6.70 | 6.70 | 6.70 | 6.70 |

Molded articles prepared from the cured compositions of Examples 2–4 are prepared by conventional plastic processing techniques. Cross sections of the molded articles may be examined with microscope or scanning electron microscopes. The dynamic vulcanizates made with the masterbatches in Examples 2–4 have a smooth surface and a non-porous structure compared to molded articles prepared in the same way, but without using the masterbatch process.

Example 5

Physical properties are measured of compositions of Example 2, The masterbatch of peroxide is added to the molten blend of elastomer and thermoplastic at 250° C. The batch process is used.

| Composition of example | % thermo-plastic | Shore A hardness | tensile strength, MPa | modulus at 50%, MPa | elongation at break, % |
|---|---|---|---|---|---|
| 2a | 20 | 80 | 5.25 | 2.49 | 157 |
| 2b | 33 | 86 | 6.95 | 3.39 | 223 |
| 2c | 50 | 93 | 10.68 | 4.97 | 339 |
| 2d | 60 | 96 | 13.24 | 6.25 | 371 |
| 2e | 67 | 97 | 14.25 | 6.93 | 383 |

Example 6

Physical properties are measured as for Example 5, except that the compositions are obtained by adding a peroxide masterbatch to a molten blend of elastomer and thermoplastic at 150° C. The batch process is used.

| Composition of example, masterbatch added at 150° C. | % thermo-plastic | Shore A hardness | tensile strength, MPa | modulus at 50%, MPa | elongation at break, % |
|---|---|---|---|---|---|
| 2a | 20 | — | — | — | — |
| 2b | 33 | 81 | 11.17 | 4.41 | 192 |
| 2c | 50 | 90 | 15.93 | 5.93 | 282 |
| 2d | 60 | 91 | 18.62 | 8.48 | 346 |
| 2e | 67 | 95 | 22.6 | 8.06 | 442 |

Example 7

Comparative

Moldable compositions are prepared according to the recipes given in Example 2 (batch process), except that the peroxide and TAIC are added to the molten blend of elastomer and thermoplastic as individual components, and not as part of a masterbatch containing a fluorocarbon elastomer portion. The temperature of the molten blend is 250° C.

| Example | % thermo-plastic | Shore A hardness | tensile strength, MPa | modulus at 50%, MPa | elongation at break, % |
|---|---|---|---|---|---|
| 7a | 20 | 74 | 2.11 | 1.69 | 385 |
| 7b | 33 | 78 | 2.4 | 2.32 | 286 |
| 7c | 50 | 90 | 3.62 | 3.58 | 182 |
| 7d | 60 | 95 | 5.14 | 5.03 | 92 |
| 7e | 67 | 95 | 6.66 | 6.34 | 167 |

What is claimed is:

1. A method of preparing a moldable polymer composition comprising:
   (a) forming a mixture of a fluoroplastic thermoplastic material and a curable fluorocarbon elastomer at a temperature above the melting point of the thermoplastic;
   (b) adding a curing composition to the mixture, wherein the curing composition comprises an initiator having a half-life of 0.1 hours or more at a temperature of about 190° C. or higher and crosslinking agent; and
   (c) heating while continuing to mix the mixture and the curing composition at a temperature and for a time sufficient to cure the elastomer.

2. A method according to claim 1, wherein the initiator has a half-life of 0.1 hours or more at a temperature of about 200° C. or higher.

3. A method according to claim 2, wherein the initiator has a half-life of 0.1 hours or more at a temperature of about 207° C.

4. A method according to claim 1, wherein the thermoplastic material comprises a fluorine-containing thermoplastic polymer.

5. A method according to claim 1, wherein the curable fluorocarbon elastomer comprises a copolymer of VDF, HFP, and a cure site monomer.

6. A method according to claim 5, wherein the curable fluorocarbon elastomer comprises a copolymer of VDF, HFP, TFE, and a cure site monomer.

7. A method according to claim 1, wherein the fluorocarbon elastomer comprises a copolymer of VDF, fluorinated vinyl ether, TFE, and a cure site monomer.

8. A method according to claim 1, wherein the fluorocarbon elastomer comprises a copolymer of VDF, propylene, TFE, and a cure site monomer.

9. A method according to claim 1, wherein the fluorocarbon elastomer comprises a copolymer of VDF, TFE, HFP, ethylene, fluorinated vinyl ether, and a cure site monomer.

10. A method according to claim 1, wherein the fluorocarbon elastomer comprises a perfluoro rubber.

11. A method according to claim 1 wherein the fluorocarbon elastomer comprises a copolymer of TFE and propylene.

12. A method according to claim 1, comprising heating the mixture above about 180° C.

13. A method according to claim 12, comprising heating the mixture above about 190° C.

14. A method according to claim 13, comprising heating the mixture above about 200° C.

* * * * *

UNITED STATES PATENT AND TRADEMARK OFFICE
CERTIFICATE OF CORRECTION

| | | |
|---|---|---|
| PATENT NO. | : 7,153,908 B2 | Page 1 of 1 |
| APPLICATION NO. | : 10/771693 | |
| DATED | : December 26, 2006 | |
| INVENTOR(S) | : Edward Hosung Park and Francis Joseph Walker | |

It is certified that error appears in the above-identified patent and that said Letters Patent is hereby corrected as shown below:

On The Title Page (75) Add -- Francis Joseph Walker, Tecumseh, MI -- as an inventor to the above-referenced issued patent.

Signed and Sealed this

Ninth Day of October, 2007

JON W. DUDAS
*Director of the United States Patent and Trademark Office*